(12) United States Patent
Han et al.

(10) Patent No.: US 6,469,874 B1
(45) Date of Patent: Oct. 22, 2002

(54) METHOD TO MAKE A STITCHED WRITER FOR A GIANT MAGNETO-RESISTIVE HEAD

(75) Inventors: Cherng-Chyi Han, San Jose, CA (US); Mao-Min Chen, San Jose, CA (US); Po-Kang Wang, San Jose, CA (US); Moris Musa Dovek, San Jose, CA (US); Gene Michael Sandler, San Jose, CA (US); Jeu-Wei C. Koo, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/523,993

(22) Filed: Mar. 13, 2000

(51) Int. Cl.$^7$ .............................................. G11B 5/127
(52) U.S. Cl. ..................................................... 360/317
(58) Field of Search ........................... 29/603.1–603.11; 360/317, 119, 122, 125, 126

(56) References Cited

U.S. PATENT DOCUMENTS

| | | | |
|---|---|---|---|
| 5,282,308 A | 2/1994 | Chen et al. .................... 29/603 |
| 5,283,942 A | 2/1994 | Chen et al. .................... 29/603 |
| 5,363,265 A | * 11/1994 | Hsie et al. .................. 360/122 |
| 5,375,023 A | 12/1994 | Ju et al. ...................... 360/119 |
| 5,446,613 A | 8/1995 | Rottmayer |
| 5,726,841 A | 3/1998 | Tong et al. .................. 360/122 |
| 5,898,548 A | 4/1999 | Dill et al. |
| 5,910,870 A | 6/1999 | Ishiwata |
| 6,016,242 A | * 1/2000 | Mastain et al. ............. 360/119 |
| 6,376,013 B1 | * 4/2002 | Rangarajan et al. ........ 427/240 |

* cited by examiner

Primary Examiner—Allen Cao
(74) Attorney, Agent, or Firm—George O. Saile; Stephen B. Ackerman

(57) ABSTRACT

A high data-rate stitched pole inductive magnetic write head incorporating a non-magnetic spacer layer and a magnetic pole yoke that is recessed from the magnetic pole tip. Said spacer layer is deposited as part of a self-aligned, patterned photoresist process, wherein the spacer layer is deposited first and the P2 portion of the upper pole assembly is then plated over it to form the pole tip configuration. Increasing the thickness of the spacer layer, while keeping it within a specified tolerance range, allows the upper stitched P3 portion of the pole piece to be recessed relative to the tip of P2. The spacer layer shortens throat height, reduces saturation write current, and improves overwrite and side erasure performance.

27 Claims, 3 Drawing Sheets

METHOD TO MAKE A STITCHED WRITER FOR A GIANT MAGNETO-RESISTIVE HEAD

BACKGROUND OF THE INVENTION

1. Field of the Invention

This invention relates to the fabrication of a thin-film magnetic head. In particular, it relates to a method of fabricating a stitched writer portion of such a head that is suitable for high data-rate encoding of magnetic information.

2. Discussion of the Related Art

Thin film magnetic heads are used to encode and decode data stored in the form of small magnetized regions on disks and tapes. These heads contain a read portion, which is typically a shielded magnetic field sensor of a giant magneto-resistive (GMR) type, and a write portion, consisting of a magnetic pole and yoke structure inductively energized by current carrying coils.

The need to encode and decode data stored with increasing areal densities and at increasingly higher data rates has necessitated the design of very narrow write heads with high linear resolution. The narrow write head allows data to be stored in narrow tracks, the high linear resolution, requiring narrow write gaps and strong magnetic fields, allows the storage of more data per unit length of track.

The need to produce narrow heads, narrow gaps and complex topologies has led to several novel fabrication schemes. Chen et al (U.S. Pat. No. 5,283,942) teach a method for fabricating a planar thin film head wherein a sacrificial layer is introduced to provide greater control over the gap planarization procedure. Ju et al (U.S. Pat. No. 5,375,023) teach a method for fabricating a thin film inductive head having staggered pole tips and a self-aligned recording gap region. Tong et al (U.S. Pat. No. 5,726,841) teach a method for forming a trimmed-head pole tip with beveled surfaces that is capable of recording data with narrow track widths. Rottmayer (U.S. Pat. No. 5,446,613) teaches a method for forming a head that combines a read portion and a write portion and whose poles themselves carry high current with minimal heating and low current density. Dill et al (U.S. Pat. No. 5,898,548) teaches a method for forming a magnetic tunnel junction magneto-resistive read head whose shields also function as elecrical leads to the sensing circuitry. Ishiwata (U.S. Pat. No. 5,910,870) teaches a method for forming a multi-layer magneto-resistive head structure having a laminated magnetic layer isolated from its magnetic pole layer.

Most applicable to the present invention, however, is the invention of Chen et al (U.S. Pat. No. 5,282,308), which teaches a simplified method of forming a narrow upper magnetic pole piece by joining or "stitching" together two separately deposited pole pieces, the upper pole tip and the upper pole yoke, along a pedestal formed from a portion of the upper pole tip photoresist mask. In contrast to methods that form the upper pole piece and yoke monolithically, the stitching process allows the narrow tip section to be formed within a thinner photoresist mask, which is highly advantageous in the context of the fabrication process.

The present invention extends the capabilities of the stitched writer design and fabrication process by overcoming several serious deficiencies which limit its applicability to high data-rate encoding. In particular, because the stitched writer head as formed by the methods of the present art cited above has a lengthy throat region, it requires a high saturation writing current, which, in turn, causes side erasures and adversely affects data already written on adjacent disk areas. In addition, the lengthy throat region causes poor nonlinear transition shift performance (interference between the magnetic field produced by transitions already on the written medium and the field being used to write the next transitions on that medium) and poor overwrite performance (the ability to write over previously written low frequency data with new high frequency data). The present invention teaches a method for fabricating a stitched head writer than retains all the advantages of that structure and its method of fabrication, but eliminates the problems that render it less able to perform high data-rate encoding.

SUMMARY OF THE INVENTION

A first object of this invention is to fabricate a stitched pole magnetic write head that is capable of encoding magnetic data at high rates.

A second object of this invention is to fabricate a stitched pole magnetic write head that has a lower saturation write current.

A third object of this invention is to fabricate a stitched pole magnetic write head with improved nonlinear transition shift performance.

A fourth object of this invention is to fabricate a stitched pole magnetic write head having improved overwrite performance.

A fifth object of this invention is to fabricate a stitched pole magnetic write head that significantly reduces the problem of side erasure.

A sixth object of this invention is to fabricate a stitched pole magnetic write head with a reduced effective throat height.

A seventh object of this invention is to fabricate a stitched pole magnetic write head having an increased ratio of P2/P3 contact area to throat area. In this notation, P2 is the upper pole tip and P3 is the upper pole yoke piece stitched to that tip.

An eighth object of this invention is to fabricate a stitched pole magnetic write head with reduced constraints on the P2 sidewall and P3 shape.

A ninth object of this invention is to achieve each of the objects cited above without increasing the P2/P3 alignment tolerances established by the present pole stitching fabrication process.

These objects will be achieved by means of a novel modification of the present stitched pole fabrication process. The proposed modification is the formation of a non-magnetic spacer of appropriate dimension beneath the P2 portion of the upper pole assembly where it contacts the upper surface of the write gap layer. Said spacer is deposited as part of a self-aligned, patterned photoresist process, wherein the spacer is deposited first and P2 is then plated over it to form the pole tip configuration. Increasing the thickness of the spacer layer, while keeping it within a specified tolerance range, allows the upper stitched P3 portion of the pole piece to be recessed relative to the tip of P2. This stepped pole configuration allows the objects cited above to be achieved.

DESCRIPTIONS OF THE PREFERRED EMBODIMENTS

The present invention is a high data-rate stitched pole magnetic write head and a method for fabricating it. This head can be formed as part of a giant magneto-resistive read/write head structure.

A description of the preferred embodiments of this invention will be given in the context of the schematic drawings designated FIG. 1A, FIG. 1B, FIG. 1C, FIG. 1D, FIG. 2, FIG. 3, FIG. 4, FIG. 5, FIG. 6, FIG. 7, FIG. 8 and FIG. 9.

Figure 1A:
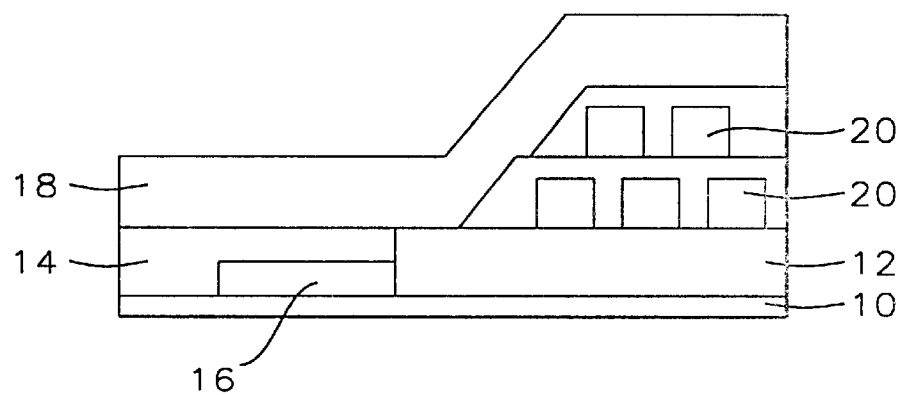
FIG. 1A is a schematic cross-sectional view of the stitched pole piece fabricated with the spacer layer according to the present invention but with P3 not recessed relative to P2.

Referring now to FIG. 1A, we see a schematic cross-sectional view of a completed stitched pole magnetic write head fabricated according to a first preferred embodiment of the present invention. In this embodiment, the upper pole yoke portion, P3 (18), has been stitched to the upper pole piece, P2 (14), so that they are not recessed relative to each other (i.e. (18) and (14) are co-planar at the air-bearing surface). The non-magnetic spacer layer (16) is shown and P3, P2 and the spacer layer configuration have been deposited on the write gap layer (10). The induction coils (20) are shown beneath the upper pole yoke as is an insulating layer (12) which abuts P2 and serves as a base for the coil structure. The details of this fabrication process will be given in the context of FIG. 2 through FIG. 9.

Figure 1B:
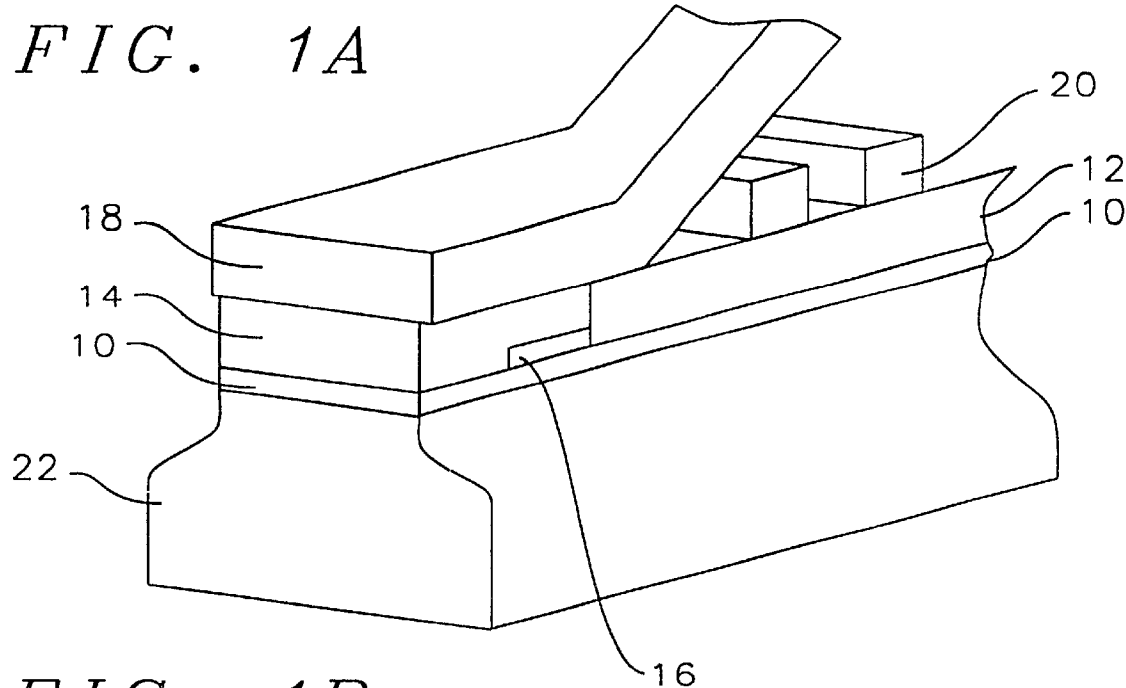
FIG. 1B is a perspective view of the fabrication in FIG. 1A, showing, in addition to the features in FIG. 1A, the lower pole piece, P1.

FIG. 1B shows a schematic perspective view of the fabrication in FIG. 1A and includes, for completeness, the lower pole piece (22), which can also serve as an upper shield for the giant magneto-resistive read head which is not shown.

Figure 1C:
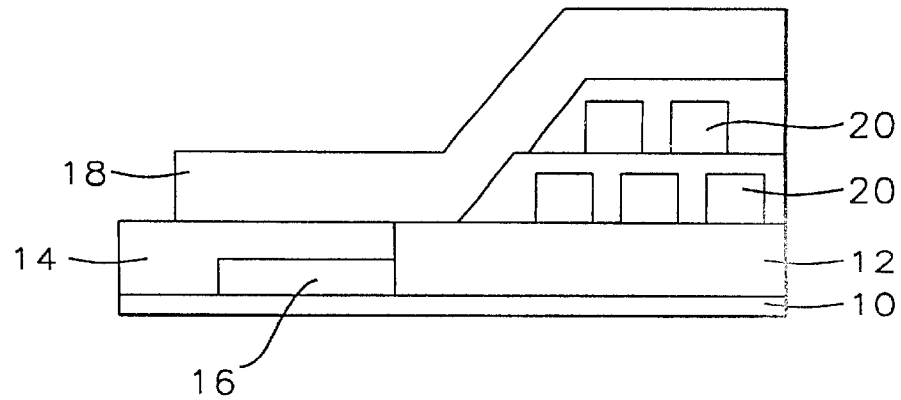
FIG. 1C is a schematic cross-sectional view of the stitched pole piece fabricated according to the present invention with a longer spacer layer and with P3 recessed relative to P2.

FIG. 1C shows a schematic cross-sectional view of a completed stitched-pole magnetic write head fabricated according to a second preferred embodiment of the present invention. This fabrication is identical to that depicted in FIG. 1A, except that the spacer layer (16) and upper pole piece P2 (14) are longer and the upper pole yoke P3 (18) has been stitched so that it is recessed relative to P2 (14).

Figure 1D:
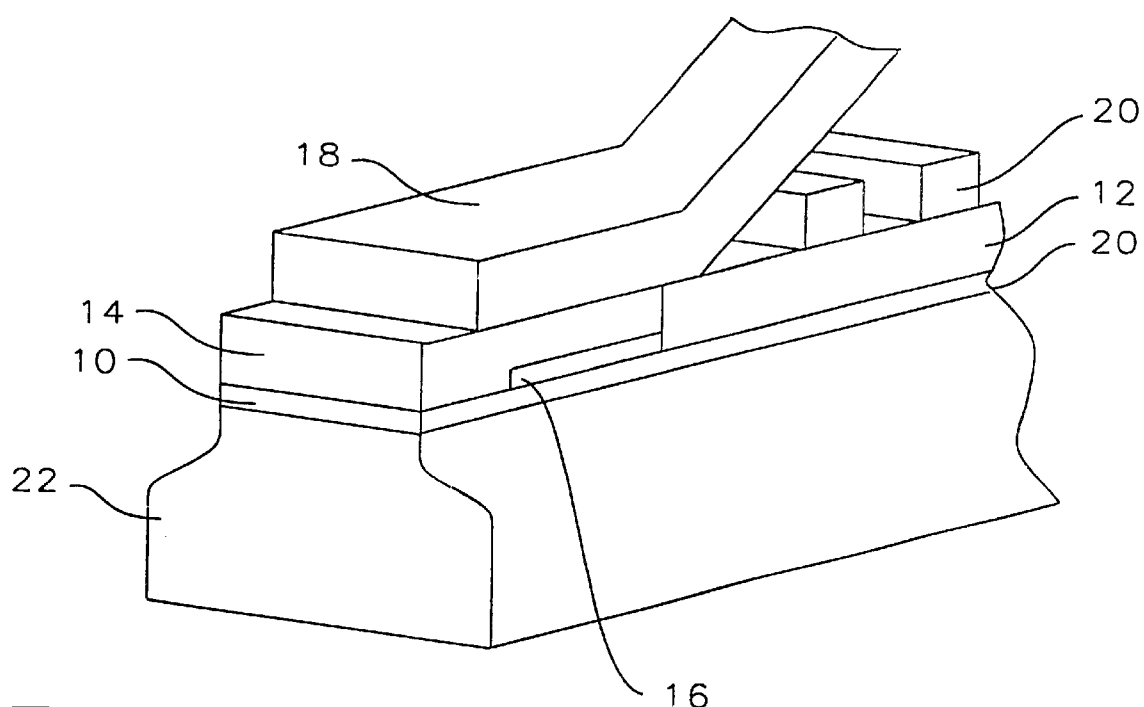
FIG. 1D is a perspective view of the fabrication in FIG. 1C, showing, in addition to the features in FIG. 1C, the lower pole piece, P1.

FIG. 1D shows a schematic perspective view of the fabrication in FIG. 1C and includes, for completeness, the lower pole piece (22), which can also serve as an upper shield for the giant magneto-resistive read head which is not shown.

Figure 2:
FIG. 2 is a schematic cross-sectional view of the initial process step leading to the completed fabrication shown in FIGS. 1A, 1B, 1C and 1D. It shows a photoresist layer deposited on a write gap layer.

FIG. 2 shows the first step of the fabrication process leading to the completed fabrication of either FIG. 1A or FIG. 1C. In FIG. 2, the write gap layer (10), which is a dielectric layer of alumina deposited to a thickness of between 800 angstroms and 5000 angstroms, has been coated with a photoresist layer (22) of a thickness between 1.0 microns and 5.0 microns. The photoresist layer will be patterned, exposed and developed to define both the spacer layer and the pole tip structure P2 according to the method used to create self-aligned depositions.

Figure 3:
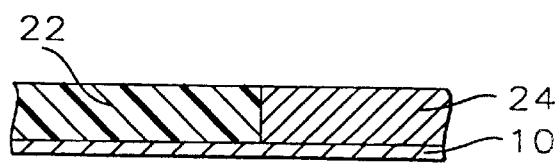
FIG. 3 shows the photoresist layer of FIG. 2 with the spacer deposition region having been exposed.

FIG. 3 shows the exposure of the photoresist layer (22) in the spacer layer deposition region (24).

Figure 4:
FIG. 4 shows the removal of said exposed region after development.

FIG. 4 shows the photoresist layer (22) subsequent to development and removal of the portion defining the spacer layer.

Figure 5:
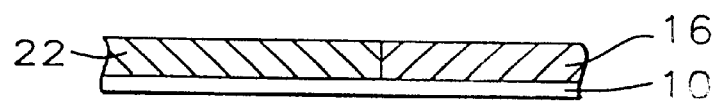
FIG. 5 shows the deposition of a non-magnetic spacer layer.

FIG. 5 shows the deposition of the spacer layer (16), which will be a layer of non-magnetic material such as NiCu, Alumina, Ta or PdCu, deposited to a thickness of between 0.3 microns and 0.8 microns and a width between 5.0 microns and 7.0 microns. For the embodiment in which the upper pole yoke is not to be recessed, said spacer layer will have a length between 0.5 microns and 1.0 microns. For the embodiment in which the upper pole yoke is to be recessed, the spacer layer will have a length between 0.5 microns and 1.5 microns.

Figure 6:
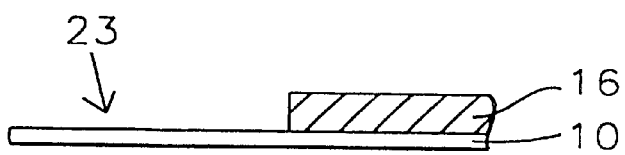
FIG. 6 shows the removal of the remaining photoresist layer so as to define the region for depositing the pole tip P2.

FIG. 6 shows the removal of the remaining portion of the photoresist layer to expose a region (23) on which the pole tip, P2, will be formed.

Figure 7:
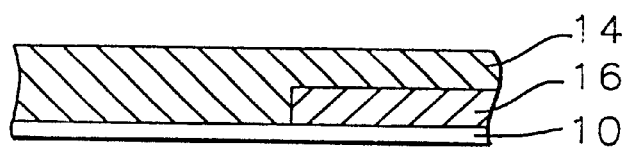
FIG. 7 shows the deposition of pole tip P2 by plating over the exposed write gap layer and spacer layer.

FIG. 7 shows the formation of the magnetic pole tip, P2 (14), over said exposed region and the spacer layer. The pole tip can be of magnetic material such as FeN, FeAlN, FeTaN or CoNiFe and will be formed by plating or deposition to a thickness of between 0.5 microns and 3.0 microns and a length between 3.0 microns and 6.0 microns.

Figure 8:
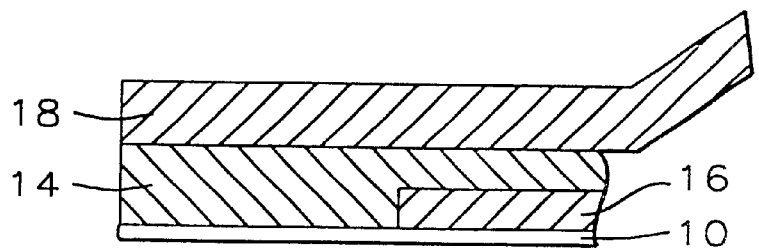
FIG. 8 shows the deposition of the stitched upper pole yoke portion P3 according to an embodiment of the present invention that does not recess P3 relative to P2.

FIG. 8 shows the upper pole yoke, P3 (18), stitched to pole tip P2 (14) but, in this embodiment, not recessed relative to P2. The upper pole yoke, P3, may be of magnetic material such as FeN, FeTaN, FeAlN or CoFeV, and be deposited to a thickness of between 1.5 microns and 3.0 microns and will be wider than P2 (14) by approximately 0.5 microns on each side.

Figure 9:
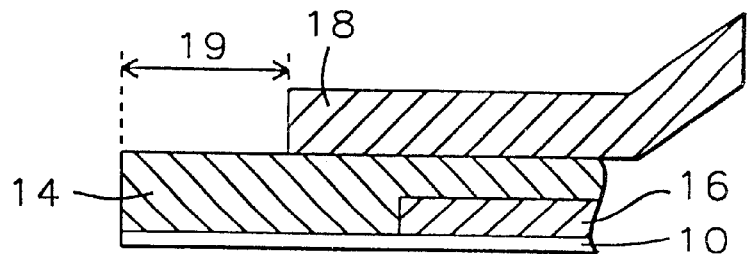
FIG. 9 shows the deposition of the stitched upper pole yoke portion P3 according to an embodiment of the present invention that recesses P3 relative to P2. Note that FIG. 9 represents an alternative configuration to FIG. 8.

FIG. 9 shows the equivalent final step as that depicted in FIG. 8, but now done according to a second preferred embodiment of the invention, in which the spacer layer (16), of non-magnetic material such as NiCu, Alumina, Ta or PdCu, is deposited to a thickness of between 0.3 microns and 0.8 microns, with a width between 5.0 microns and 7.0 microns and a length between 0.5 microns and 1.5 microns. The upper pole piece, P2 (14), which can be of magnetic material such as FeN, FeAlN, FeTaN or CoNiFe is plated on or deposited to a thickness of between 0.5 microns and 3.0 microns and has a width between 3.0 microns and 5.0 microns and a length between 3.0 microns and 6.0 microns. The upper yoke, P3 (18), is stitched to the upper pole piece, P2 (14) and is recessed relative to the air bearing surface of said upper pole piece by a distance of between 0.15 microns and 1.5 microns (19).

As is finally understood by a person skilled in the art, the preferred embodiments of the present invention are illustrative of the present invention rather than limiting of the present invention. Revisions and modifications may be made to materials, structures and dimensions used to form a high data-rate stitched pole magnetic write head and to the methods for fabricating it in accord with the preferred embodiments of the present invention, while still providing a high data-rate stitched pole magnetic write head and a method for fabricating it in accord with the present invention as provided by the appended claims.

What is claimed is:

1. A method for forming a giant magneto-resistive head with a high data-rate stitched pole magnetic write head comprising:

providing a giant magneto-resistive read head assembly having an upper magnetic shield which will serve as a lower pole piece for an inductive magnetic write head, upon which a write-gap layer has been deposited and planarized;

depositing on said write-gap layer-a photoresist layer of thickness between 1.0 microns and 5.0 microns;

exposing a first region of said photoresist layer;

developing and removing said first region;

depositing in said region a spacer layer of non-magnetic material;

exposing a second region of said photoresist layer;

developing and removing said second region;

depositing a pole tip layer of magnetic material in said second region and over said spacer layer;

depositing a pole yoke layer over said pole tip layer so that the front surfaces of the pole tip layer and the pole yoke layer are co-planar.

2. The method of claim 1 wherein the spacer layer is a layer of NiCu, deposited to a thickness of between 0.3 microns and 0.8 microns and a length between 0.5 microns and 1.0 microns.

3. The method of claim 1 wherein the spacer layer is a layer of PdCu, deposited to a thickness of between 3.0 microns and 0.8 microns and a length between 0.5 microns and 1.0 microns.

4. The method of claim 1 wherein the spacer layer is a layer of alumina, deposited to a thickness of between 3.0 microns and 0.8 microns and a length between 0.5 microns and 1.0 microns.

5. The method of claim 1 wherein the spacer layer is a layer of Ta, deposited to a thickness of between 0.3 microns and 0.8 microns and a length between 0.5 microns and 1.0 microns.

6. The method of claim 1 wherein the upper pole tip layer is formed of FeN, deposited to a thickness of between 0.5 microns and 3.0 microns and a length between 3.0 microns and 6.0 microns.

7. The method of claim 1 wherein the upper pole tip layer is formed of FeAlN, deposited to a thickness of between 0.5 microns and 3.0 microns and a length between 3.0 microns and 6.0 microns.

8. The method of claim 1 wherein the upper pole tip layer is formed of FeTaN, deposited to a thickness of between 0.5 microns and 3.0 microns and a length between 3.0 microns and 6.0 microns.

9. The method of claim 1 wherein the upper pole tip layer is formed of CoNiFe, deposited to a thickness of between 0.5 microns and 3.0 microns and a length between 3.0 microns and 6.0 microns.

10. The method of claim 1 wherein the upper pole yoke layer is formed of FeN, deposited to a thickness of between 1.5 microns and 3.0 microns.

11. The method of claim 1 wherein the upper pole yoke layer is formed of FeAlN, deposited to a thickness of between 1.5 microns and 3.0 microns.

12. The method of claim 1 wherein the upper pole yoke layer is formed of FeTaN, deposited to a thickness of between 1.5 microns and 3.0 microns.

13. The method of claim 1 wherein the upper pole yoke layer is formed of CoFeV, deposited to a thickness of between 1.5 microns and 3.0 microns.

14. A method for forming a giant magneto-resistive head with a high data-rate stitched pole magnetic write head comprising:

providing a giant magneto-resistive read head assembly having an upper magnetic shield which will serve as a lower pole piece for an inductive magnetic write head, upon which a write-gap layer has been deposited and planarized;

depositing on said write-gap layer a photoresist layer of thickness between 1.0 microns and 5.0 microns;

exposing a first region of said photoresist layer;

developing and removing said first region;

depositing in said region a spacer layer of non-magnetic material;

exposing a second region of said photoresist layer;

developing and removing said second region;

depositing a pole tip layer of magnetic material in said second region and over said spacer layer;

depositing a pole yoke layer over said pole tip layer so that the front surface of the pole yoke layer is recessed relative to the front surface of the pole tip layer.

15. The method of claim 14 wherein the spacer layer is a layer of NiCu, deposited to a thickness of between 3.0 microns and 0.8 microns and a length of between 0.5 microns and 1.5 microns.

16. The method of claim 14 wherein the spacer layer is a layer of PdCu, deposited to a thickness of between 3.0 microns and 0.8 microns and a length of between 0.5 microns and 1.5 microns.

17. The method of claim 14 wherein the spacer layer is a layer of alumina, deposited to a thickness of between 3.0 microns and 0.8 microns and a length of between 0.5 microns and 1.5 microns.

18. The method of claim 14 wherein the spacer layer is a layer of Ta, deposited to a thickness of 3.0 microns and 0.8 microns and a length of between 0.5 microns and 1.5 microns.

19. The method of claim 14 wherein the upper pole tip layer is formed of FeN, deposited to a thickness of between 0.5 microns and 3.0 microns and a width of between 3.0 microns and 5.0 microns and a length between 3.0 microns and 6.0 microns.

20. The method of claim 14 wherein the upper pole tip layer is formed of FeAlN, deposited to a thickness of between 0.5 microns and 3.0 microns and a length between 3.0 microns and 6.0 microns and a width between 3.0 microns and 5.0 microns.

21. The method of claim 14 wherein the upper pole tip layer is formed of FeTaN, deposited to a thickness of between 0.5 microns and 3.0 microns a width between 3.0 microns and 5.0 microns and a length between 3.0 microns and 6.0 microns.

22. The method of claim 14 wherein the upper pole tip layer is formed of CoNiFe, deposited to a thickness of between 0.5 microns and 3.0 microns a width between 3.0 microns and 5.0 microns and a length between 3.0 microns and 6.0 microns.

23. The method of claim 14 wherein the upper pole yoke layer is formed of FeN, deposited to a thickness of between 1.5 microns and 3.0 microns.

24. The method of claim 14, wherein the upper pole yoke layer is formed of FeAlN, deposited to a thickness of between 1.5 microns and 3.0 microns.

25. The method of claim 14 wherein the upper pole yoke layer is formed of FeTaN, deposited to a thickness of between 0.5 microns and 3.0 microns.

26. The method of claim 14 wherein the upper pole yoke layer is formed of CoFeV, deposited to a thickness of between 1.5 microns and 3.0 microns.

27. The method of claim 14 wherein the upper pole yoke layer is recessed relative to the upper pole tip layer by a distance of between 0.15 microns and 1.5 microns.

* * * * *